March 12, 1940.   E. E. BASHORE   2,193,386
FLY LINE GREASING DEVICE
Filed June 21, 1939
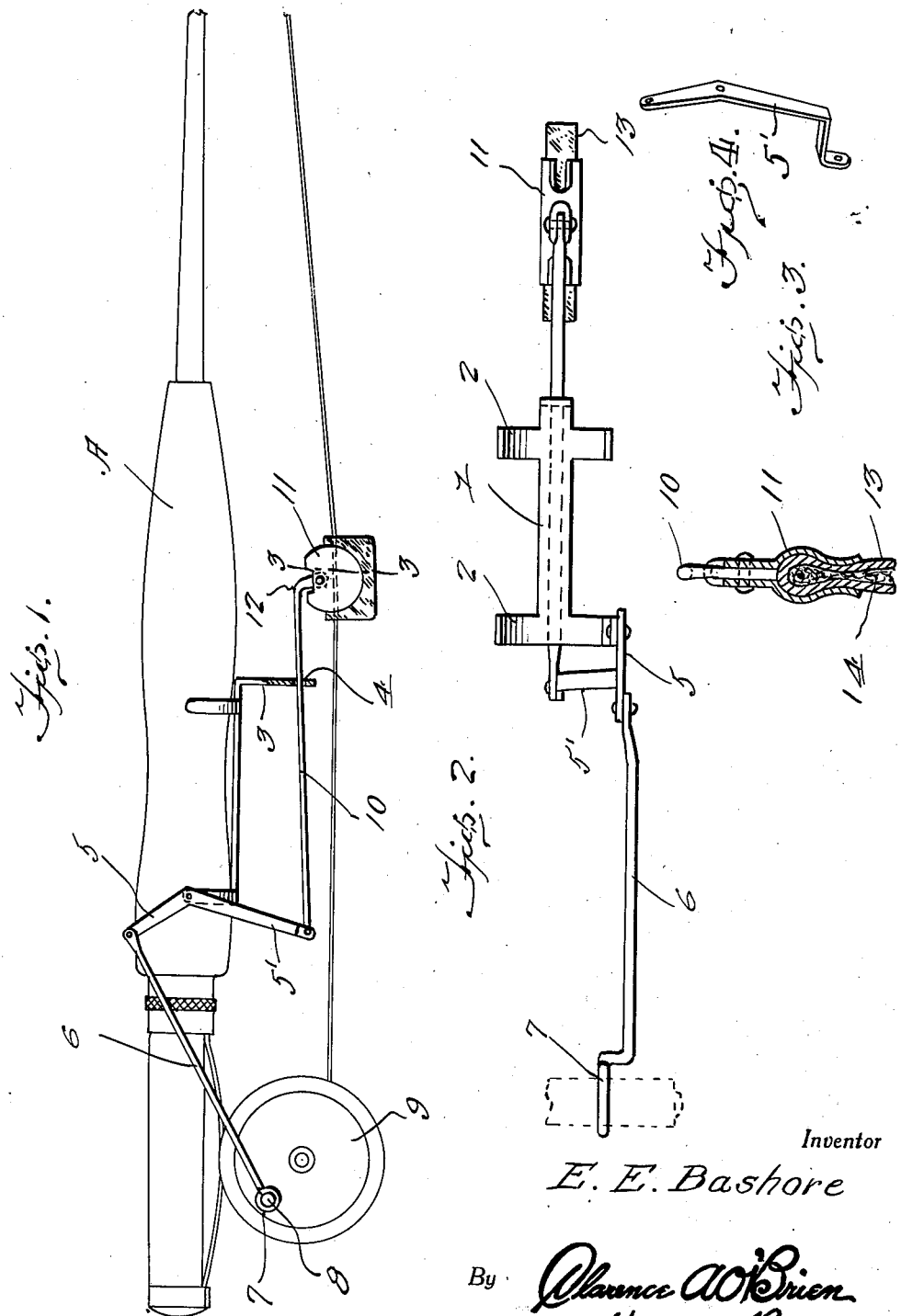
Inventor
*E. E. Bashore*
By *Clarence A. O'Brien
and Hyman Berman*
Attorneys Patented Mar. 12, 1940

2,193,386

UNITED STATES PATENT OFFICE 2,193,386

FLY LINE GREASING DEVICE

Elmer E. Bashore, Bellefontaine, Ohio

Application June 21, 1939, Serial No. 280,387

2 Claims. (Cl. 43—25)

This invention relates to a device for greasing fly lines, the general object of the invention being to provide a bracket having means for detachably connecting it to a fly rod and supporting means whereby the turning of the reel of the pole to wind the line thereon will operate a greasing pad in a reciprocatory manner on the line as the same is being wound on the reel.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is an elevation showing the device applied to a fly rod and in use in greasing a line.

Figure 2 is a top plan view of the device.

Figure 3 is a section on the line 3—3 of Figure 1.

Figure 4 is a perspective view of the lever.

In these views the numeral 1 indicates a bracket of elongated form and having the substantially U-shaped spring gripping parts 2 for gripping the handle of a fly rod A, as shown in Figure 1, so as to detachably hold the bracket on the rod. The front end of the bracket has a depending part 3 provided with an eye 4 and a lever 5 is pivoted, intermediate its ends, to an end of the rear U-shaped member 2. A pitman rod 6 is pivoted to the upper end of the lever 5 and has an eye 7 at its free end which is adapted to be placed over the handle 8 of the reel 9 of the fish pole, the handle acting as a crank as the reel is turned to cause the rod 6 to rock the lever 5. The lower part 5' of the lever 5 has its lower end bent inwardly at right angles and then downwardly, as shown more particularly in Figure 4. A rod 10 is pivoted to this downwardly bent lower end of the lever and passes through the eye 4 and has a spring clamp 11 pivoted to its front end, said front end being turned downwardly as shown at 12. This clamp is adapted to hold a pad 13 which is impregnated with grease or lubricant as shown at 14, the pad being in loop shape when placed in the clamp.

In carrying out the invention the line is unwound from the reel and the bracket 1 placed in engagement with the handle of the pole, the eye 7 of rod 6 placed over the handle 8 of the reel. Then the pad 13 is placed over the line and the pad placed in the clamp 11. Then the reel is turned to wind the line thereupon and as this winding action is taking place the turning of the reel will reciprocate the rod 10 and, therefore, the clamp and pad so that the line is thoroughly greased as it is being wound upon the reel.

By bending the lower part of the lever as shown in Figure 4 the rod 10 is located under the pole so that the pad will properly engage the line as it is being wound upon the reel It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A device for greasing fishing lines comprising a bracket detachably connected with a fishing pole, a lever pivoted to the bracket, a rod pivoted to one end of the lever, means for guiding the rod by the bracket, a pad carrying clamp attached to the rod for engaging a line and means for rocking the lever to reciprocate the rod as the reel is being turned.

2. A device for greasing fishing lines comprising a bracket detachably connected with a fishing pole, a lever pivoted to the bracket, a rod pivoted to one end of the lever, means for guiding the rod by the bracket, a pad carrying clamp attached to the rod for engaging a line and means for rocking the lever to reciprocate the rod as the reel is being turned, said means including a pitman pivoted to the other end of the lever and having an eye for engaging an eccentric handle of the reel.

ELMER E. BASHORE.